(12) United States Patent
Tanaka et al.

(10) Patent No.: US 11,339,057 B2
(45) Date of Patent: *May 24, 2022

(54) PREPARATION OF SINTERABLE COMPLEX OXIDE POWDER AND MANUFACTURING OF TRANSPARENT CERAMICS

(71) Applicant: Shin-Etsu Chemical Co., Ltd., Tokyo (JP)

(72) Inventors: Keita Tanaka, Annaka (JP); Masanori Ikari, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 465 days.

This patent is subject to a terminal disclaimer.

(21) Appl. No.: 16/419,609

(22) Filed: May 22, 2019

(65) Prior Publication Data
US 2019/0359496 A1 Nov. 28, 2019

(30) Foreign Application Priority Data
May 24, 2018 (JP) .............................. JP2018-099587

(51) Int. Cl.
*C01F 17/34* (2020.01)
*C09K 11/77* (2006.01)
(Continued)

(52) U.S. Cl.
CPC ............ *C01F 17/34* (2020.01); *G02F 1/0036* (2013.01); *H01F 1/0018* (2013.01);
(Continued)

(58) Field of Classification Search
CPC .......... C09K 11/7774; C09K 11/77742; C09K 11/77744; C09K 11/77746;
(Continued)

(56) References Cited

U.S. PATENT DOCUMENTS 9,470,915 B2 10/2016 Makikawa et al.
11,124,426 B2 * 9/2021 Tanaka .................... C04B 35/50
(Continued)

FOREIGN PATENT DOCUMENTS

JP 3642063 B2 4/2005
JP 4878343 B2 2/2012
(Continued)

OTHER PUBLICATIONS

Aung et al., "Development of optical grade $(Tb_xY_{1-x})_3Al_5O_{12}$ ceramics as Faraday rotator material", Journal American Ceramic Society, 2017, vol. 100, No. 9, pp. 4081-4087.

*Primary Examiner* — Matthew E. Hoban
(74) *Attorney, Agent, or Firm* — Birch, Stewart, Kolasch & Birch, LLP (57) ABSTRACT

To a co-precipitating aqueous solution, aqueous solutions containing (a) Tb ions, (b) at least one other rare earth ions selected from the group consisting of Y ions and lanthanoid rare earth ions (excluding Tb ions), (c) Al ions and (d) Sc ions are added; the resulting solution is stirred at a liquid temperature of 50° C. or less to induce a co-precipitate of the components (a), (b), (c) and (d); the co-precipitate is filtered, heated and dehydrated; and the co-precipitate is fired thereafter at from 1,000° C. to 1,300° C., thereby forming a sinterable garnet-type complex oxide powder.

6 Claims, 2 Drawing Sheets

(51) Int. Cl.
  *G02F 1/00* (2006.01)
  *H01F 1/00* (2006.01)
  *G02F 1/09* (2006.01)

(52) U.S. Cl.
  CPC ...... *C01P 2002/30* (2013.01); *C01P 2002/52* (2013.01); *C01P 2006/42* (2013.01); *C01P 2006/60* (2013.01); *G02F 1/093* (2013.01)

(58) Field of Classification Search
  CPC ......... C09K 11/77747; C09K 11/77748; C01F 17/34; G02F 1/0036; H01F 1/0018
  See application file for complete search history.

(56) References Cited

U.S. PATENT DOCUMENTS

| | | | |
|---|---|---|---|
| 11,161,274 B2* | 11/2021 | Matsumoto | C04B 35/50 |
| 2004/0035357 A1 | 2/2004 | Sekijima et al. | |
| 2005/0099786 A1* | 5/2005 | Liu | C09K 11/7774 |
| | | | 362/231 |
| 2013/0069007 A1* | 3/2013 | Miyagawa | C09K 11/7774 |
| | | | 252/301.4 R |
| 2016/0145765 A1 | 5/2016 | Matsui et al. | |
| 2018/0194685 A1 | 7/2018 | Yanagitani et al. | |

FOREIGN PATENT DOCUMENTS

| | | |
|---|---|---|
| JP | 5704097 B2 | 4/2015 |
| JP | 5935764 B2 | 6/2016 |
| WO | WO 2017/033618 A1 | 3/2017 |

\* cited by examiner

PREPARATION OF SINTERABLE COMPLEX OXIDE POWDER AND MANUFACTURING OF TRANSPARENT CERAMICS

CROSS-REFERENCE TO RELATED APPLICATION

This non-provisional application claims priority under 35 U.S.C. § 119(a) on Patent Application No. 2018-099587 filed in Japan on May 24, 2018, the entire contents of which are hereby incorporated by reference.

TECHNICAL FIELD

The present invention relates to a method for preparing a sinterable complex oxide powder and a method for manufacturing a transparent ceramic material, and more particularly to a method for preparing a sinterable complex oxide powder and a method for manufacturing a transparent ceramic material for use as magneto-optical materials composed of garnet-type transparent ceramic containing a rare earth element, such as terbium, suitable for constituting a magneto-optical device such as an optical isolator.

BACKGROUND ART

In recent years, laser processing using a fiber laser has started to emerge as the laser output becomes higher. In order to stably perform laser processing, it is necessary to remove light from the outside so as not to disturb the oscillation state. Especially when the light is reflected on the end face of the fiber, the reflected light reaches a laser light source. As a result, the oscillation is greatly disturbed. Therefore, a part called an isolator is attached to the boundary connecting the fiber and the fiber in a common fiber laser to suppress the reflected light completely.

The isolator is constituted by a Faraday rotator, a polarizer disposed on the light incident side of the Faraday rotator, and an analyzer disposed on the light emission side of the Faraday rotator. In addition, the Faraday rotator applies a magnetic field parallel to the traveling direction of the light to be utilized. At this time, the polarized wave component of the light rotates only in a certain direction regardless of forward or backward traveling in the Faraday rotator. Furthermore, the Faraday rotator is adjusted to a length that the polarized wave component of the light is rotated by exactly 45 degrees. Herein, when the polarization planes of the polarizer and the analyzer are shifted by 45 degrees in the rotation direction of the forward traveling light, the polarized waves of the forward traveling light coincides at the position of the polarizer and at the position of the analyzer, and the forward traveling light is transmitted. On the other hand, the polarized waves of the backward traveling light is rotated by 45 degrees in the direction opposite to the deviation angle direction of the polarization plane of the polarizer shifted by 45 degrees from the position of the analyzer. Then, the polarization plane of the return light at the position of the polarizer is shifted by 45 degrees −(−45 degrees)=90 degrees from the polarization plane of the polarizer, and the return light cannot be transmitted. In this way, the optical isolator functions to transmit and emit the forward traveling light and block the return light traveling backward.

Examples of a material existing conventionally as a Faraday rotator include garnet based $Tb_3Ga_5O_{12}$ (JP-B 4878343 (Patent Document 1)) and $Tb_3Al_5O_{12}$ (JP-B 3642063 (Patent Document 2)), and C-type rare earth based $(Tb_xRe_{(1-x)})_2O_3$ (JP-B 5704097 (Patent Document 3)). These materials in common contain terbium having a large Verdet constant (magneto-optical constant) with small light absorption at 1,064 nm used by a laser. However, various magneto-optical materials each have the following problems.

The garnet based $Tb_3Ga_5O_{12}$ (TGG) has a small amount of terbium contained in the crystal so that the Verdet constant is small, the Faraday rotator needs to be lengthened, and the beam quality tends to be poor. On the other hand, the similar garnet based $Tb_3Al_5O_{12}$ (TAG) uses aluminum with an ionic radius shorter than that of gallium so that the amount of terbium contained in the crystal is increased, and the Faraday rotator can be shortened. However, since the TAG is an incongruent melting crystal, there is a restriction that a perovskite phase is first formed (precipitated) at a solid-liquid interface at the time of crystal growth and then a TAG phase is formed (precipitated). In other words, the TAG crystal can be grown only in a state where the garnet phase and the perovskite phase are always mixedly present, and good-quality, large-size TAG crystal growth has not been realized. Finally, the C-type rare earth based $(Tb_xRe_{(1-x)})_2O_3$ can increase the terbium content as compared with other materials and contributes to the shortening of the isolator, but high-valent terbium is likely to occur, and the light absorption is also large as compared with the garnet based materials. If the light absorption is large, there is a problem that, for example, when a high power laser of 100 W or more is inserted, the isolator itself largely generates heat due to the absorbed light energy, resulting in deterioration of the laser quality.

At present, the most commonly used Faraday rotator is TGG, but the Verdet constant of the TGG is also small so that the improvement has been demanded. Although the TAG is expected as an alternative to the TGG, it was difficult to grow the TAG crystal due to the aforementioned incongruent melting. Therefore, TAG ceramics (WO 2017/033618 (Patent Document 4)) and a $Tb_3Sc_2Al_3O_{12}$ (TSAG) crystal (JP-B 5935764 (Patent Document 5)) are exemplified for the purpose of making a substance similar to the TAG crystal. Since the former TAG ceramics can be produced at the incongruent melting temperature or less, different phases can be controlled to some extent. However, it is difficult to completely suppress the occurrence of different phases due to a compositional deviation and the like, and the scattering state is still too large to be used for optical applications. Moreover, with the latter TSAG, it is possible to suppress incongruent melting by adding Sc and further correct even subtle compositional deviations. Therefore, it is easy to grow the crystal. However, since a large amount of expensive Sc is used, the TSAG is costly and has not yet been practically used.

Recently, YTAG ceramics, in which yttrium is substituted for some of terbium of TAG ceramics, have been disclosed (Non-Patent Document 1).

By substituting yttrium for some of terbium of unstable TAG, the structure stabilization is realized, and a Faraday rotator, which has a potential to outperform the performance of the TGG crystal, has already been known. Note that the substitution with yttrium reduces the terbium content, and the Verdet constant becomes lower than that of the TAG ceramics. However, since the TAG ceramics originally has the Verdet constant 1.5 times higher than that of the TGG ceramics, the YTAG ceramics have the Verdet constant the same as or slight greater than that of the TGG crystal. Thus, the YTAG ceramics are not disadvantageous as an isolator material. Furthermore, by substituting yttrium for some of terbium in the TAG ceramics, it is possible to suppress the light loss derived from the absorption by terbium. As a result, there is a possibility that the YTAG ceramics can be used as an isolator material for a high power fiber laser compared with the TAG ceramics. However, the structure stabilization of the YTAG ceramics is still insufficient, and it was difficult to practically use the YTAG ceramics unless high-quality transparent ceramics can be produced with a high yield.

CITATION LIST

Patent Document 1: JP-B 4878343
Patent Document 2: JP-B 3642063
Patent Document 3: JP-B 5704097
Patent Document 4: WO 2017/033618
Patent Document 5: JP-B 5935764
Non-Patent Document 1: Yan Lin Aung, Akio Ikesue, Development of optical grade $(Tb_xY_{1-x})_3Al_5O_{12}$ ceramics as Faraday rotator material, J. Am. Ceram. Soc., 100(9), 4081-4087 (2017)

SUMMARY OF THE INVENTION

The present invention has been made in light of the above circumstances, and an object thereof is to provide a method for preparing a sinterable complex oxide powder, in which garnet-type rare earth complex oxide powder in which four constituent elements, terbium, at least one other rare earth element selected from the group consisting of yttrium and lanthanide rare earth (excluding terbium), aluminum and scandium are all uniformly distributed, is synthesized by a coprecipitation method, and a method for further manufacturing a transparent ceramic material using the powder prepared by the method.

The inventors have started to improve the YTAG ceramics by utilizing the transparent ceramics technology which has been conventionally known and found out that the crystal structure is stabilized by substituting Sc for part of the backbone of the YTAG ceramics, and the quality of the YTAG ceramics are improved as the transparent ceramics. Moreover, at this time, the amount of Sc is small. Thus, this does not really cause a problem in terms of the costs as well.

However, the conventional YTAG ceramics produced by mixing various kinds of oxides and solid phase reaction had a problem that hard powder (i.e., hard aggregates of particles), which cannot be crushed by ball mill crushing or the like performed thereafter, is generated at the time of calcination (firing), and as it is, coarse cavities are formed inside of the compact at the time of molding. Furthermore, when the hard powder was removed in order to avoid the problem, the yield was decreased, causing another problem which is not preferable from the viewpoint of the productivity.

The inventors investigated these problems and proved that such hard aggregates were not seen in the manufacturing of transparent ceramics so far but were the problems unique to aluminum garnet containing Tb (the TAG including the YTAG). The inventors also found out that these problems are due to a change in density occurring when the raw material powder containing Tb oxide was subjected to the solid phase reaction to form garnet structure and also found that, in the production of aluminum garnet based ceramics containing Tb, it is preferable to use raw material powder, which has already become garnet structure, in the production, instead of producing ceramics with desired composition by the solid phase reaction. The inventors further found that, in order to obtain a ceramic raw material powder formed into garnet structure with desired composition, it is important to synthesize particles by a build-up method rather than a top-down method such as a crushing method, and thereby the occurrence of the hard powder, which is the problem as described above, can be completely suppressed. Based on these finding, the inventors have made further improvements and achieved the present invention.

That is, the present invention is a method for preparing a sinterable complex oxide powder and a method for manufacturing a transparent ceramic material described below.
1. A method for preparing a sinterable complex oxide powder comprising the steps of:
adding, to a co-precipitating aqueous solution, aqueous solutions containing (a) terbium ions, (b) at least one other rare earth ions selected from the group consisting of yttrium ions and lanthanoid rare earth ions (excluding terbium ions), (c) aluminum ions and (d) scandium ions;
stirring the resulting solution at a liquid temperature of 50° C. or less to induce a co-precipitate of the components (a), (b), (c) and (d);
filtering, heating and dehydrating the co-precipitate; and firing the co-precipitate thereafter at from 1,000° C. to 1,300° C., thereby forming a powder composed of garnet-type complex oxide represented by the formula (1):

$$(Tb_{1-x-y}R_xSc_y)_3(Al_{1-z}Sc_z)_5O_{12} \qquad (1)$$

wherein R is at least one element selected from the group consisting of yttrium and lanthanoid rare earth elements (excluding terbium), 0.05≤x<0.45, 0<y<0.1, 0.5<1-x-y<0.95, and 0.004<z<0.2.
2. The method for preparing the sinterable complex oxide powder according to 1, wherein the component (b) is the yttrium ions and/or lutetium ions.
3. The method for preparing the sinterable complex oxide powder according to 1 or 2, wherein the aqueous solutions containing the components (a), (b), (c) and (d) are inorganic acid aqueous solutions, and the co-precipitating aqueous solution is a carbonate aqueous solution.
4. The method for preparing the sinterable complex oxide powder according to any one of 1 to 3, wherein the aqueous solution containing the component (a), the aqueous solution containing the component (b), the aqueous solution containing the component (c) and the aqueous solution containing the component (d) are separately prepared and mixed, and this mixed aqueous solution is added to the co-precipitating aqueous solution.
5. The method for preparing the sinterable complex oxide powder according to any one of 1 to 4, wherein the aqueous solutions containing the components (a), (b), (c) and (d) are added to the co-precipitating aqueous solution, and then this solution is stirred for 12 hours or longer while keeping the solution at a temperature of from 20° C. to 50° C. to grow particles of the co-precipitate of the components (a), (b), (c) and (d).
6. A method for manufacturing a transparent ceramic material comprising the steps of molding the garnet-type complex oxide powder prepared by the method of any one of 1 to 5 into a compact, sintering the compact thereafter and pressure sintering the compact.

Advantageous Effects of the Invention

According to the present invention, it is possible to provide the sinterable garnet-type rare earth complex oxide powder, in which four constituent elements, terbium, at least one other rare earth element selected from the group consisting of yttrium and lanthanide rare earth (excluding terbium), aluminum and scandium, are all uniformly distributed, and to provide the garnet-type transparent ceramic material having uniform transparency by molding and sintering the powder.

DESCRIPTION OF THE PREFERRED EMBODIMENT

Method for Preparing Sinterable Complex Oxide Powder

Hereinafter, a method for preparing a sinterable complex oxide powder according to the present invention is described.

A method for preparing a sinterable complex oxide powder according to the present invention is characterized by: adding, to a co-precipitating aqueous solution, aqueous solutions containing (a) terbium ions, (b) at least one other rare earth ions selected from the group consisting of yttrium ions and lanthanoid rare earth ions (excluding terbium ions), (c) aluminum ions and (d) scandium ions; stirring the resulting solution at a liquid temperature of 50° C. or less to induce a co-precipitate of the components (a), (b), (c) and (d); filtering, heating and dehydrating the co-precipitate; and firing the co-precipitate thereafter at 1,000° C. or more and 1,300° C. or less, thereby forming a powder composed of garnet-type complex oxide represented by the following formula (1):

$(Tb_{1-x-y}R_xSc_y)_3(Al_{1-z}Sc_z)_5O_{12}$ (1)

wherein R is at least one element selected from the group consisting of yttrium and lanthanoid rare earth elements (excluding terbium), $0.05 \leq x < 0.45$, $0 < y < 0.1$, $0.5 < 1-x-y < 0.95$, and $0.004 < z < 0.2$.

Composition

The composition of the sinterable complex oxide (garnet-type rare earth complex oxide), which is a subject in the present invention, is represented by the above formula (1). Note that, in the garnet crystal structure represented by the formula (1), the Tb-coordinated side, that is, the side within the former parentheses in the formula (1) is referred to as an A site, and the Al-coordinated side, that is, the side within the latter parentheses in the formula (1) is referred to as a B site.

In the A site of the formula (1), Tb is the element having the greatest Verdet constant among the paramagnetic element group excluding iron (Fe) and is the element most suitable to be used as a material for an optical isolator for a wavelength region of 1,064 nm since the absorption does not occur in this wavelength region used by a fiber laser. However, Tb easily reacts with oxygen in the air, and high-valent Tb is generated. Since this high-valent Tb has light absorption properties, it is desirable to eliminate this Tb as much as possible. To eliminate this high-valent Tb, it is most preferable to employ a crystal structure that does not generate the high-valent Tb, that is, a garnet structure.

At the A site of the formula (1), R is at least one other rare earth element selected from the group consisting of yttrium and lanthanide rare earth elements (excluding terbium (Tb)). Specifically, R is at least one element selected from the group consisting of yttrium (Y), lanthanum (La), cerium (Ce), praseodymium (Pr), neodymium (Nd), promethium (Pm), samarium (Sm), europium (Eu), gadolinium (Gd), dysprosium (Dy), holmium (Ho), erbium (Er), thulium (Tm), ytterbium (Yb) and lutetium (Lu). Among them, R is preferably at least one element selected from the group consisting of Y, Ce, Sm, Eu, Gd, Dy, Ho, Er, Tm, Yb and Lu, is more preferably Y and/or Lu from the viewpoint that the absorption does occur in the used wavelength band, and is still more preferably Y or Lu.

Moreover, in the B site of the formula (1), Al is the element having the shortest ionic radius among trivalent ions that can stably exist in oxide having a garnet structure, and is the element that can minimize the lattice constant of the Tb-containing paramagnetic garnet-type oxide. If the lattice constant of the garnet structure can be decreased without changing the Tb content, the Verdet constant per unit length can be increased, which is preferable. The Verdet constant of the actual TAG ceramic is improved to 1.25 to 1.5 times that of a TGG. Therefore, even when a relative concentration of terbium is lowered by substituting the above R ions for some of the terbium ions, the Verdet constant per unit length can be kept equal to or slightly lower than that of the TGG. Thus, these are constituent elements suitable in the present invention.

Herein, the complex oxide containing only the constituent elements of Tb, R (other rare earth) and Al may not have a garnet structure due to a slight weighing error, and it is difficult to stably produce a transparent ceramic usable for optical applications. Therefore, in the present invention, scandium (Sc) is added as a constituent element to eliminate compositional deviation due to a slight weighing error. Sc is the element that has an intermediate ionic radius and can be solid solution in both the A site and the B site in the oxide having a garnet structure. Sc is also a buffer element that can be solid solution by adjusting the distribution ratio thereof to the A site (rare earth site composed of Tb and R) and the B site (aluminum site) so as to exactly match the stoichiometric ratio and thereby minimize the generation energy of the crystallite when the compounding ratio of the rare earth elements of Tb and R to Al is deviated from the stoichiometric ratio due to variation at the time of weighing. Sc is also an element that can limit the abundance of the alumina different phase in the garnet parent phase to 1 ppm or less and limit the abundance of the perovskite-type different phase in the garnet parent phase to 1 ppm or less. Thus, Sc is an indispensable element in the present invention.

In the formula (1), the range of x is $0.05 \leq x < 0.45$, preferably $0.1 \leq x \leq 0.4$, and more preferably $0.2 \leq x \leq 0.35$. If x is in this range, the perovskite-type different phase can be reduced to a level that cannot be detected by X-ray diffraction (XRD) analysis. Furthermore, the abundance of the perovskite-type different phase (which have a typical type size of 1 μm to 1.5 μm in diameter and are granular appearing to be colored by light brown) in a viewing field of 150 μm×150 μm by optical microscope observation is one or less, which is preferable. The abundance of the perovskite-type different phase at this time in the garnet parent phase is 1 ppm or less. Similarly, if x is in the above range, the amount of pores (which have a typical size of 0.5 μm to 2.0 μm in diameter and become spherical gaps when subjected to HIP treatment) remaining in the ceramic sintered body in a viewing field of 150 μm×150 μm by optical microscope observation is one or less in abundance, which is preferable. The abundance of the pores at this time in the garnet parent phase is 1 ppm or less.

When x is less than 0.05, the effect of substituting R for some of Tb cannot be obtained, and this is not substantially different from the conditions for creating the TAG. Thus, it becomes difficult to stably produce a high-quality ceramic sintered body with low scattering and low absorption, which is unpreferable. Moreover, when x is 0.45 or more, the Verdet constant for a wavelength of 1,064 nm becomes less than 30 rad/(T·m), which is unpreferable. Furthermore, if the relative concentration of Tb is excessively diluted, the overall length necessary to rotate laser light with a wavelength of 1,064 nm by 45 degrees becomes long, exceeding 25 mm. This makes the production difficult, which is unpreferable.

In the formula (1), the range of y is $0<y<0.1$, preferably $0<y<0.08$, more preferably $0.002 \leq y \leq 0.07$, and still more preferably $0.003 \leq y \leq 0.06$. If y is in this range, the perovskite-type different phase can be reduced to a level that cannot be detected by X-ray diffraction (XRD) analysis. Furthermore, the abundance of the perovskite-type different phase (which have a typical type size of 1 μm to 1.5 μm in diameter and are granular appearing to be colored by light brown) in a viewing field of 150 μm×150 μm by optical microscope observation is one or less, which is preferable. The abundance of the perovskite-type different phase at this time in the garnet parent phase is 1 ppm or less.

When y=0, the perovskite-type different phase is highly likely to precipitate, which is unpreferable. Moreover, when y is 0.1 or more, R is substituted for some of Tb, and further Sc is substituted for some of Tb while the effect of suppressing the precipitation of the perovskite-type different phase is saturated and unchanged. As a result, the solid solution concentration of Tb is unnecessarily lowered, thereby decreasing the Verdet constant. This is unpreferable. Furthermore, Sc is expensive as a raw material, so unnecessary excessive doping of Sc is unpreferable from the viewpoint of the production costs.

In the formula (1), the range of 1-x-y is $0.5<1-x-y<0.95$, preferably $0.55 \leq 1-x-y<0.95$, and more preferably $0.6 \leq 1-x-y<0.95$. If 1-x-y is in this range, a large Verdet constant can be secured as well as high transparency can be obtained for a wavelength of 1,064 nm.

In the formula (1), the range of z is $0.004<z<0.2$, preferably $0.004<z<0.16$, more preferably $0.01 \leq z \leq 0.15$, and still more preferably $0.03 \leq z \leq 0.15$. If z is in this range, the perovskite-type different phase cannot be detected by XRD analysis. Furthermore, the abundance of the perovskite-type different phase (which have a typical type size of 1 μm to 1.5 μm in diameter and are granular appearing to be colored by light brown) in a viewing field of 150 μm×150 μm by optical microscope observation is one or less, which is preferable. The abundance of the perovskite-type different phase at this time in the garnet parent phase is 1 ppm or less.

When z is 0.004 or less, the perovskite-type different phase is highly likely to precipitate, which is unpreferable. Moreover, when z is 0.2 or more, the value of y, that is, the substitution ratio of Sc for Tb also increases in conjunction with the increase in the value of z while the effect of suppressing the precipitation of the perovskite-type different phase is saturated and unchanged. As a result, the solid solution concentration of Tb is unnecessarily lowered, thereby decreasing the Verdet constant. This is unpreferable. Furthermore, Sc is expensive as a raw material, so unnecessary excessive doping of Sc is unpreferable from the viewpoint of the production costs.

The method for preparing the sinterable complex oxide powder according to the present invention is to create the garnet-type complex oxide powder represented by the formula (1) by the steps of preparing a co-precipitate of the aforementioned components (a), (b), (c) and (d); filtering and washing the co-precipitate; heat-drying (dehydrating) and crushing; and firing. The details are described below.

In the method for preparing the sinterable complex oxide powder according to the present invention, it is preferable that an aqueous solution containing the component (a), an aqueous solution containing the component (b), an aqueous solution containing the component (c) and an aqueous solution containing the component (d) are added together to a co-precipitating aqueous solution, and that the resulting solution is stirred to induce a state where the components (a), (b), (c) and (d) are coprecipitated. Herein, adding together to a co-precipitating aqueous solution is referred to simultaneously adding a plurality of target aqueous solutions to a co-precipitating aqueous solution, and preferably to mixing a plurality of target aqueous solutions separately prepared and adding (dropping) this mixed aqueous solution to a co-precipitating aqueous solution (hereinafter the same applies to this specification).

Figure 1:
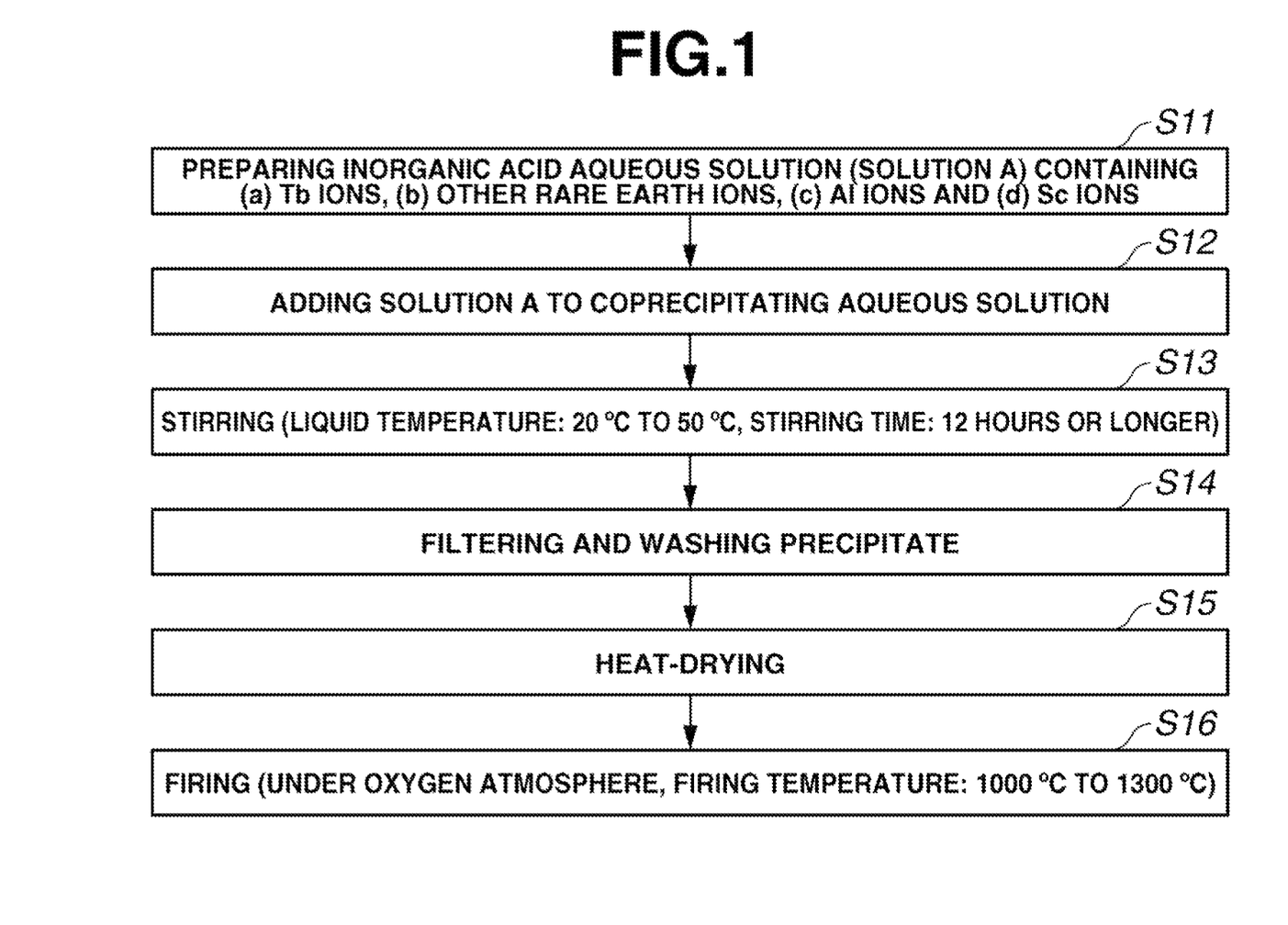
FIG. 1 is a flowchart showing an example of a procedure for preparing a sinterable complex oxide powder according to the present invention.

FIG. 1 shows the specific procedure. Herein, the description is given where other rare earth (R) is yttrium as an example.

Step S11

Prepare an inorganic acid aqueous solution (solution A) containing (a) Tb ions, (b) Y ions, (c) Al ions and (d) Sc ions.

Specifically, first, separately prepare an aqueous solution containing the component (a), an aqueous solution containing the component (b), an aqueous solution containing the component (c) and an aqueous solution containing the component (d). The aqueous solutions containing the components (a), (b), (c) and (d) are not particularly limited as long as the aqueous solutions contain the components (a), (b), (c) and (d) (i.e., containing the components as ions), but are each preferably an inorganic acid aqueous solution.

Herein, as the raw material for the component (a), a powdery material with preferably the purity of 99.9% by weight or more, more preferably the purity of 99.99% by weight or more, or still more preferably the purity of 99.999% by weight or more, is preferable. At this time, the raw material is not particularly limited as long as the raw material can be dissolved to form the aqueous solution. For example, the raw material may be terbium oxide powder ($Tb_2O_3$) or $Tb_4O_7$ powder. Alternatively, the raw material may be powder of other compounds, such as fluoride or nitride of terbium, as long as the raw material is dissolved in the acidic aqueous solution, does not form complex ions, and becomes terbium ions. Terbium oxide powder is more preferable since impurity ions may influence the reaction or firing.

As the raw material for the component (b), a powdery material with preferably the purity of 99.9% by weight or more, more preferably the purity of 99.99% by weight or more, or still more preferably the purity of 99.999% by weight or more, is preferable. At this time, the raw material is not particularly limited as long as the raw material can be dissolved to form the aqueous solution. For example, the raw material may be yttrium oxide powder ($Y_2O_3$). Alternatively, the raw material may be powder of other compounds, such as fluoride or nitride of Y, as long as the raw material is dissolved in the acidic aqueous solution, does not form complex ions, and becomes Y ions. Yttrium oxide powder is more preferable since impurity ions may influence the reaction or firing.

As the raw material for the component (c), a powdery material with preferably the purity of 99.9% by weight or more, more preferably the purity of 99.99% by weight or more, or still more preferably the purity of 99.999% by weight or more, is preferable. At this time, the raw material is not particularly limited as long as the raw material can be dissolved to form the aqueous solution. Examples of the raw material include aluminum nitrate, aluminum chloride, aluminum hydroxide, aluminum ethoxide and the like, and aluminum hydroxide is more preferable.

As the raw material for the component (d), a powdery material with preferably the purity of 99.9% by weight or more, more preferably the purity of 99.99% by weight or more, or still more preferably the purity of 99.999% by weight or more, is preferable. In this case, scandium oxide powder is preferable. Alternatively, the raw material may be powder of other compounds, such as fluoride or nitride of Sc, as long as the raw material is dissolved in the acidic aqueous solution, does not form complex ions, and becomes Sc ions. The scandium oxide powder is more preferable since impurity ions may influence the reaction or firing.

Each of these raw materials is dissolved in an inorganic acid aqueous solution so as to have a predetermined concentration.

The inorganic acid aqueous solutions to be used are not particularly limited as long as the inorganic acid aqueous solutions can dissolve the raw materials of the four components without forming complex ions and contain ions of the components (a) to (d), and are preferably aqueous solutions to which strong acid is added. Moreover, the counter ions (i.e., anions) contained in the aqueous solutions are not particularly limited, and nitrate ions, sulfate ions, halide ions, phosphate ions and the like are available. Examples of the aqueous solutions include 5N nitric acid aqueous solution, sulfuric acid aqueous solution, hydrochloric acid aqueous solution, and the like. In this case, an acidic aqueous solution which dissolves each and every raw material for the four components is preferable, and a nitric acid solution is more preferable. When the nitric acid solution is used, the remaining amount of inorganic salts after firing is small. Each of the concentrations of the aqueous solutions is preferably 1.5 M or more and 3.0 M or less.

Note that the temperatures for preparing the aqueous solutions containing the respective components (a), (b), (c) and (d) are not particularly limited. However, for example, when aluminum hydroxide is dissolved, a temperature of 200° C. or more is not preferable because aluminum hydroxide is dehydrated and forms aluminum oxide which is difficult to dissolve. It is preferable to prepare the aqueous solutions under the temperature conditions suitable for the substances.

The aqueous solution containing the component (a), the aqueous solution containing the component (b), the aqueous solution containing the component (c) and the aqueous solution containing the component (d) obtained as described above are accurately weighted to form the composition (mole fraction) of the formula (1) and sufficiently stirred and mixed, thereby obtaining the inorganic acid aqueous solution (solution A) containing the (a) Tb ions, the (b) Y ions, the (c) Al ions and the (d) Sc ions. This fraction is directly applied to the weight ratio (parts by weight) in the raw material powder obtained by the coprecipitation method.

Alternatively, the inorganic acid aqueous solution (solution A) containing the (a) Tb ions, the (b) Y ions, the (c) Al ions and the (d) Sc ions may be obtained as follows: the raw material for the component (a), the raw material for the component (b), the raw material for the component (c) and the raw material for the component (d) are each weighed to form the composition (mole fraction) of the formula (1); then, these raw materials are mixed, and the mixed powder is dissolved in an inorganic acid aqueous solution thereafter; alternatively, each raw material is sequentially dissolved in the inorganic acid aqueous solution.

Note that, from the viewpoint of reproducibility, it is preferable to separately prepare the aqueous solution containing the component (a), the aqueous solution containing the component (b), the aqueous solution containing the component (c) and the aqueous solution containing the component (d).

The concentration of each aqueous solution can be determined by inductively coupled plasma mass spectrometry (ICP-MS), spectrophotometry, or gravimetry, and is preferably determined by ICP-MS which can measure the concentrations most conveniently with good reproducibility (up to this step included in step S11).

Step S12

Next, add the resulting solution A to a co-precipitating aqueous solution (solution B). Herein, the co-precipitating aqueous solution is not particularly limited as along as the co-precipitating aqueous solution is a basic aqueous solution which can coprecipitate the ions of all the four components after the inorganic acid aqueous solution containing the ions of the four components (a), (b), (c) and (d) is added, remove the ions from the co-precipitate by water washing and filtering, and synthesize particles that can be transparentized at the end. Examples of the co-precipitating aqueous solution include aqueous solutions of ammonium hydrogen carbonate ($NH_4HCO_3$), ammonia water ($NH_4OH$), oxalic acid ($(COOH)_2$), ammonium carbonate ($(NH_4)_2CO_3$), ammonium oxalate and the like. Among them, carbonate aqueous solutions are preferable, and an ammonium hydrogen carbonate aqueous solution is more preferable. A precipitating aid such as ammonium sulfate may be added to the co-precipitating aqueous solution.

Note that the Sc ion has poor reactivity in the presence of carbonic acid and may not coprecipitate uniformly with other components (a) to (c). Therefore, when carbonic acid is contained in the co-precipitating aqueous solution, the aqueous solution containing the (d) Sc ions may be dropped after the aqueous solutions containing the components (a) to (c) excluding the component (d) are dropped and stirred for a while after the reaction is started, and then the carbonic acid completely escapes, besides dropping the aqueous solution containing the (d) Sc ions simultaneously with the aqueous solutions containing other components (a) to (c). The stirring time until the aqueous solution of the component (d) is dropped is preferably one hour or more from the viewpoint of a completely escape of the carbonic acid.

The pH of the liquid (solution B+A) after the solution A is added (dropped) is preferably 5.6 or more and less than 7.0, and more preferably 5.8 or more and less than 6.6. If the pH of the liquid is less than 5.6, the precipitate once obtained is redissolved and the yield may be decreased. Further, if the pH is 7.0 or more, the dispersibility of the precipitate (co-precipitate precursor) of each component becomes different, and there is a possibility that a uniform co-precipitate cannot be obtained.

Herein, it is preferable to drop the solution A in the co-precipitating aqueous solution and more preferable to drop the solution A while stirring.

Step S13

After the solution A is added to the co-precipitating aqueous solution (solution B), stir the solution B+A. When the solution A is added and the resulting solution B+A is stirred, a white precipitate, which is the co-precipitate of the components (a), (b), (c) and (d), occurs. And then, sufficient stirring is performed so that the precipitation of the components (a), (b), (c) and (d) does not become ununiform and the co-precipitate particles grow.

Herein, the co-precipitating aqueous solution (solution B+A) to which the solution A is added should be kept warm in a water bath heated to a liquid temperature of 50° C. or less, preferably 20° C. or more and 50° C. or less (i.e., from 20° C. to 50° C.), and more preferably 25° C. or more and 50° C. or less and be stirred by a rotor at a rotating speed of 200 rpm or more. If the liquid temperature exceeds 50° C., the co-precipitate particles grow large, and the sinterability thereof is poor, and powder difficult to be transparentized is formed in the subsequent sintering step. If the liquid temperature is less than 20° C., the co-precipitate particles may not grow.

Moreover, the stirring (rotating) speed of 200 rpm or more is sufficient and is not particularly limited. Stirring is continued even after the total amount of the solution A is added, and the stirring time is preferably 12 hours or longer. If the stirring time is shorter than 12 hours, the co-precipitate particles may not sufficiently grow, excessively reactive fine powder may be formed, and it may be difficult to discharge bubbles during sintering.

Step S14

After stirring for a designated period of time, filtrate and wash the resulting co-precipitate to filter and recover the resulting co-precipitate. As a filtrating and washing method, suction filtration or pressure filtration is selected, and one of the filtrations should be selected in consideration of the productivity and the like.

To wash the co-precipitate, ultrapure water with an electric conductance of 1 µS/cm or less is used, and washing is repeated until the electric conductance of the filtrate becomes preferably 20 µS/cm or less and more preferably 5 µS/cm or less. If the electric conductance of the filtrate is high, light metals such as Na and ions such as ammonium remain in the recovered co-precipitate. The light metals such as Na may cause color center (lattice defects) of the sintered body, and the ions such as ammonium may cause strongly coagulated powder in the subsequent firing step. Note that Na is often contained in an aqueous solution containing the (c) Al ions, and this washing is an important treatment when an Al raw material containing a large amount of Na is used.

Step S15

When the electric conductance of the filtrate is lowered to the minimum, recover and put the co-precipitate in a constant temperature drier at 60° C. or more for 24 hours or longer to dry.

Step S16

Fire the resulting washed and dried co-precipitate. Specifically, the co-precipitate is put in a refractory oxide container typified by yttria or alumina and heated to 1,000° C. or more and 1,300° C. or less (i.e., from 1,000° C. to 1,300° C.) in an oxygen-containing atmosphere to fire. If the firing temperature is less than 1,000° C., the crystal structure of the resulting fired powder does not become a garnet structure. If the firing temperature exceeds 1,300° C., the primary particles of the fired powder grow too large, and the coagulation state also becomes strong. This fired powder is not suitable as powder for transparent ceramics.

The firing time may be one hour or longer, and the rate of temperature increase at that time is preferably 100° C./h or more and 500° C./h or less. The firing atmosphere is preferably an oxygen-containing atmosphere of atmospheric oxygen, and a nitrogen atmosphere, an argon atmosphere, a hydrogen atmosphere, or the like is unsuitable. Furthermore, the firing furnaces and kiln are exemplified by a vertical muffle furnace, a horizontal tubular furnace, a rotary kiln and the like, and are not particularly limited as long as the target temperature can be reached and an oxygen flow can be created. Note that firing unevenness occurs if oxygen is not sufficiently supplied into the refractory container containing the crushed co-precipitate. Thus, it is necessary to make a contrivance to uniformly distribute oxygen, such as providing a vent hole in the refractory container.

As described above, the sinterable garnet-type complex oxide powder according to the present invention is obtained. At this time, the primary particle size of the sinterable complex oxide powder is preferably 70 nm or more and 200 nm or less.

Method for Manufacturing Transparent Ceramic Material

The method for manufacturing a transparent ceramic material according to the present invention is characterized by molding a compact using the garnet-type complex oxide powder prepared by the method for preparing the sinterable complex oxide powder according to the present invention, and then sintering the compact, and subsequently performing pressure sintering.

Raw Material Powder

Herein, the sinterable garnet-type complex oxide powder (ceramic powder) obtained as described above is slurried by any of various dispersing methods using a ball mill, a bead mill, a homogenizer, a jet mill, ultrasonic irradiation or the like, and dispersed to primary particles. The solvent of this slurry is not particularly limited as long as the finally resulting ceramic can be highly transparentized, and examples thereof include alcohols, such as lower alcohols having 1 to 3 carbon atoms, and pure water.

For the raw material powder used in the present invention, to the slurry obtained as described above, it is preferable to add tetraethoxysilane (TEOS) as a sintering aid in an $SiO_2$ conversion amount of more than 0 ppm to 1,000 ppm or less (more than 0% by weight to 0.1% by weight or less) in the entire raw material powder (garnet-type complex oxide powder+sintering aid), or to add $SiO_2$ powder in an amount of more than 0 ppm to 1,000 ppm or less (more than 0% by weight to 0.1% by weight or less) in the entire raw material powder (garnet-type complex oxide powder+sintering aid). If the addition amount exceeds 1,000 ppm, a slight amount of light absorption may occur due to crystal defects by Si excessively contained. Note that the timing of adding the sintering aid is most preferably the time of slurrying, such as ball mill mixing described above, but the sintering aid may be added at the time of preparing the co-precipitate of the components (a), (b), (c) and (d). The slurry containing the garnet-type complex oxide powder and the sintering aid thus obtained is referred to as a raw material powder slurry.

In addition, various organic additives may be added to the raw material powder slurry for the purpose of quality stability and yield improvement in the subsequent step of producing the ceramic. In the present invention, these are also not particularly limited. That is, various dispersants, binders, lubricants, plasticizers and the like can be suitably utilized. However, for these organic additives, it is preferable to select a high-purity type free of unnecessary metal ions.

The filtration treatment may be performed for the purpose of removing undisintegrated coarse particles remaining in the raw material powder slurry obtained as described above. If molding described later is performed in a state where the undisintegrated coarse particles remain, the optical quality of the transparent ceramic may be deteriorated due to these undisintegrated coarse particles. The filtration treatment method is not particularly limited as long as filtration to remove only the coarse particles is possible, but a filter is preferably a nylon filter from the contamination-free viewpoint. Further, the pore size thereof is preferably 50 µm or less, more preferably 20 µm or less, and still more preferably 10 µm or less.

Production Steps

In the present invention, the aforementioned raw material powder slurry is used to be molded into a predetermined shape, and then degreased and sintered thereafter to create a densified sintered body with a relative density of at least 95% or more. It is preferable to perform a hot isostatic pressing (HIP) treatment as a subsequent step. Note that, if the hot isostatic pressing (HIP) treatment is directly conducted, the paramagnetic garnet-type transparent ceramic is reduced, and slight oxygen deficiency occurs. Therefore, it is preferable to recover the oxygen deficiency by performing a slight oxidation HIP treatment or an annealing treatment in an oxidizing atmosphere after the HIP treatment. Accordingly, a transparent garnet-type oxide ceramic material without defect absorption can be obtained.

Molding

In the present invention, the aforementioned raw material powder slurry is used to be molded into a desired shape by a dry molding method or a wet molding method. At this time, the molding method is not particularly limited as long as the diameter and the length which can be used for the Faraday rotator are obtained, and the compact is not cracked or the like. Examples of the dry molding method include a pressure pressing method and a uniaxial pressing method. Examples of the wet molding method include pressure casting, centrifugal casting and extrusion. At this time, in the case of the dry molding method, it is preferable to use granules obtained by spray-drying the raw material powder slurry. Further, in the case of the wet molding method, it is preferable to use the raw material powder slurry directly or the raw material powder slurry in a state where the solvent has been removed to some extent.

In the production process of the present invention, it is preferable to further place and seal, in a deformable waterproof container, the compact formed by the dry molding method or the wet molding method using the raw material powder slurry and perform cold isostatic pressing (CIP) or warm isostatic pressing (WIP), which applies hydrostatic pressure. Note that the applied pressure is not particularly limited and should be adjusted as appropriate while the relative density of the resulting compact is checked. For example, if the applied pressure is managed in a pressure range of about 300 MPa or less, which can be handled by a commercially available CIP device or WIP device, the manufacturing costs can be suppressed. Alternatively, a hot pressing step, a discharging plasma sintering step, a microwave heating step, or the like, in which not only the molding step but also the sintering are carried out at once, can also be suitably utilized at the time of molding.

Degreasing (Burn-Out)

In the production process of the present invention, a common degreasing step can be suitably utilized. That is, for the purpose of removing organic substances such as a dispersant contained in the compact, the compact is degreased under the atmosphere or under an oxygen atmosphere. The degreasing temperature is preferably 400° C. or more and 1,000° C. or less. If the degreasing temperature is less than 400° C., organic substances may remain due to insufficient degreasing. If the degreasing temperature exceeds 1,000° C., the subsequent sintering step is influenced, which may not lead to transparentization.

Sintering

In the production process of the present invention, a common sintering step can be suitably utilized. That is, a heat sintering step, such as a resistance heating method and an induction heating method, can be suitably utilized. The atmosphere at this time is not particularly limited, and it is possible to sinter under various atmospheres of inert gas, oxygen gas, hydrogen gas, helium gas, and the like, or also under reduced pressure (in vacuum). However, since it is preferable to prevent the occurrence of oxygen deficiency at the end, an oxygen gas atmosphere and a reduced pressure oxygen gas atmosphere are exemplified as more preferable atmospheres.

The sintering temperature in the sintering step of the present invention is preferably 1,500 to 1,800° C., more preferably 1,500 to 1,780° C., and still more preferably 1,550 to 1,750° C. When the sintering temperature is in this range, densification is promoted while the precipitation of different phases is suppressed, which is preferable. If the sintering temperature is less than 1,500° C., the densification of the sintered body is insufficient. The sintering temperature exceeding 1,800° C. may exceed the incongruent melting temperature of the ceramic.

The sintering retention time in the sintering step of the present invention is sufficient for about several hours, but the relative density of the sintered body must be densified to at least 95% or more. When the sintering retention time is long, ten hours or longer, and the relative density of the sintered body is densified to 99% or more, the final transparency is improved, which is more preferable.

Hot Isostatic Pressing (HIP)

In the production process of the present invention, it is possible to further provide an additional hot isostatic pressing (HIP) treatment step after the sintering step.

Note that, as for the type of the pressurized gas medium at this time, inert gas such as argon and nitrogen, or Ar—$O_2$ can be suitably utilized. The pressure applied by the pressurized gas medium is preferably 50 to 300 MPa, and more preferably 100 to 300 MPa. If the pressure is less than 50 MPa, the transparency improving effect may not be obtained. If the pressure exceeds 300 MPa, no further transparency improvement is obtained even when the pressure is increased. Moreover, the load applied to the device becomes excessive, and the device may be damaged. It is convenient and preferable that the applied pressure be 196 MPa or less, which can be handled by a commercially available HIP device.

Moreover, the treatment temperature (predetermined retention temperature) at that time is preferably set within the range from 1,000 to 1,800° C., more preferably from 1,000 to 1,780° C., and still more preferably from 1,100 to 1,730° C. If the heat treatment temperature exceeds 1,800° C., oxygen deficiency is likely to occur, which is unpreferable. In addition, if the heat treatment temperature is less than 1,000° C., the effect of improving transparency of the sintered body is hardly obtained. Note that the retention time of the heat treatment temperature is not particularly limited. However, if the heat treatment temperature is retained for a long time, oxygen deficiency is likely to occur, which is unpreferable. Typically, the retention time is preferably set within the range from one to three hours.

Note that the heater material, the heat insulating material and the treatment container subjected to the HIP treatment are not particularly limited, but graphite, or molybdenum (Mo), tungsten (W), and platinum (Pt) can be suitably utilized, and yttrium oxide and gadolinium oxide can also be further suitably utilized as the treatment container. When the treatment temperature is 1,500° C. or less in particular, platinum (Pt) can be used as the heater material, the heat insulating material and the treatment container, and the pressurized gas medium can be Ar-02. Thus, the occurrence of oxygen deficiency during the HIP treatment can be prevented, which is preferable. When the treatment temperature exceeds 1,500° C., graphite is preferable as the heater material and the heat insulating material. In this case, any one of graphite, molybdenum (Mo) and tungsten (W) is selected as the treatment container, and one of yttrium oxide or gadolinium oxide is selected as a double container inside the treatment container. Then, if an oxygen release material is packed in the container, the occurrence amount of oxygen deficiency during the HIP treatment can be suppressed to the minimum, which is preferable.

Annealing

In the production process of the present invention, oxygen deficiency occurs in the resulting transparent ceramic sintered body after the HIP treatment is finished, and the transparent ceramic sintered body may exhibit a subtle light gray appearance. In that case, it is preferable to perform oxygen annealing treatment (oxygen deficiency recovery treatment) under an oxygen atmosphere at the HIP treatment temperature or less, typically 1,000 to 1,500° C. If the annealing temperature is less than 1,000° C., the annealing effect may be insufficient and oxygen defects may not be compensated. If the annealing temperature exceeds 1,500° C., bubbles defoamed by the HIP treatment may be regenerated, and good optical quality may not be obtained. Moreover, the retention time in this case is not particularly limited, but is preferably selected within a time period which is not less than a time sufficient for oxygen deficiency to recover and does not waste electricity cost due to unnecessarily long treatment. By this oxygen annealing treatment, even the transparent ceramic sintered bodies, which have exhibited a subtle light gray appearance by the HIP treatment step, can be all paramagnetic garnet-type transparent ceramic bodies which are colorless and transparent without defect absorption.

Optical Polishing

In the production process of the present invention, it is preferable to process the paramagnetic garnet-type transparent ceramic material, which has undergone the above series of production steps, into a predetermined shape and optically polish both end faces which are on the optically utilizing axis. The optical surface accuracy at this time is preferably $\lambda/2$ or less and particularly preferably $\lambda/8$ or less, when the measurement wavelength $\lambda=633$ nm. The conditions for the predetermined shape are that the paramagnetic garnet-type transparent ceramic material has a length so that the ceramic functions as an isolator (i.e., the incident light is rotated by 22.5°), and the length is sufficiently longer than the diameter of the laser light. For example, when the diameter of the laser light is 3 mm, unless the transparent body has a diameter of about 5 mm, which is sufficiently longer than 3 mm, the laser light hits the edge of the transparent body and scatters as a result, and the laser light with high intensity leaks out, which is dangerous.

Note that the optical loss can be further reduced by forming antireflection films as appropriate on the optically polished surfaces.

Since the garnet-type complex oxide powder obtained as described above has already become the garnet structure at the stage of being powder, it is possible to solve the problem of the hard powder derived from the conventional Tb—Al reaction. That is, since there is no hard powder, a coarse cavity does not occur inside the ceramic sintered body, high transparency is obtained, the extinction ratio of the entire ceramic is improved, and a paramagnetic garnet-type transparent ceramic material with excellent magneto-optical properties is obtained.

Magneto-Optical Device

Furthermore, since the paramagnetic garnet-type transparent ceramic material obtained in the present invention is presumed to be utilized as a magneto-optical material, it is preferable to apply a magnetic field to the paramagnetic garnet-type transparent ceramic material parallel to the optic axis thereof and then set a polarizer and an analyzer such that their optical axes are shifted from each other by 45 degrees, thereby constituting a magneto-optical device to be utilized. That is, the magneto-optical material according to the present invention is suitable for magneto-optical device applications and is suitably used as a Faraday rotator of an optical isolator for a wavelength of 0.9 to 1.1 μm in particular.

Figure 2:
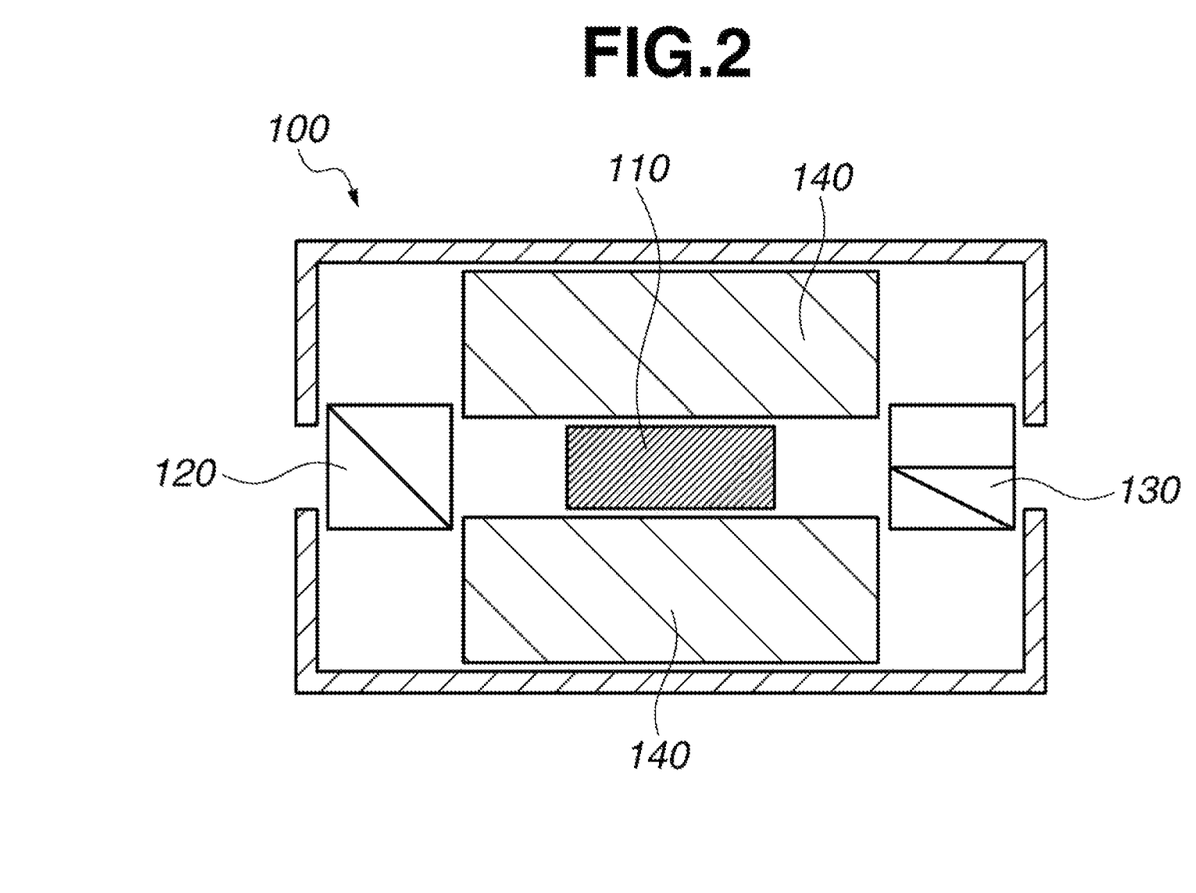
FIG. 2 is a schematic cross-sectional view showing a configuration example of an optical isolator using a transparent ceramic prepared by the present invention as a Faraday rotator.

FIG. 2 is a schematic cross-sectional view showing one example of an optical isolator which is an optical device having, as an optical element, a Faraday rotator made of the magneto-optical material according to the present invention. In FIG. 2, an optical isolator 100 includes a Faraday rotator 110 made of the magneto-optical material (the paramagnetic garnet-type transparent ceramic material) according to the present invention, and a polarizer 120 and an analyzer 130, which are polarization materials, are provided in front of and behind the Faraday rotator 110, respectively. Further, in the optical isolator 100, it is preferable that the polarizer 120, the Faraday rotator 110 and the analyzer 130 be disposed in this order, and a magnet 140 be placed on at least one of the side faces thereof.

In addition, the above optical isolator 100 can be suitably utilized for industrial fiber laser devices. That is, the optical isolator 100 is suitable to prevent the reflected light of the laser light emitted from a laser light source from returning to the light source to cause unstable oscillation.

EXAMPLES

Hereinafter, the present invention is more specifically described with reference to Examples and Comparative Examples, but the present invention is not limited to the Examples.

Example 1

Sinterable garnet-type complex oxide powder was created as below.

(Synthesis of Raw Material Powder)

High purity terbium oxide powder ($Tb_4O_7$, purity: 99.999%), high purity yttrium oxide powder (purity: 99.999%) and scandium oxide powder (purity 99.99%) manufactured by Shin-Etsu Chemical Co., Ltd., and high purity aluminum hydroxide powder (purity: 99.999%) manufactured by Nippon Light Metal Co., Ltd. were prepared, and separately heated and dissolved in different 2N nitric acid aqueous solutions to obtain four respective aqueous solutions, an aqueous solution containing the component (a), an aqueous solution containing the component (b), an aqueous solution containing the component (c) and an aqueous solution containing the component (d), in which the concentrations of the (a) Tb ions, the (b) Y ions, the (c) Al ions and the (d) Sc ions were adjusted to about 2 M, respectively.

Then, the precise concentrations of these aqueous solutions were determined by ICP-MS analysis. These aqueous solutions were weighed so as to have the five target compositions shown in Table 1, and mixed so as to be the total volume of 200 mL (preparation of mixed aqueous solution).

Subsequently, the mixed aqueous solution was dropped to a co-precipitating aqueous solution containing 2 M ammonium hydrogen carbonate and 0.016 M ammonium sulfate while being heated and stirred. The liquid temperature of the water bath was 30° C., and the stirring speed was 300 rpm at this time. Moreover, the amount of the co-precipitating aqueous solution was adjusted so that the pH after the mixed aqueous solution was dropped becomes 5.8. After the completion of dropping the mixed aqueous solution, the mixture was stirred for 24 hours. At this time, the stirring speed was 300 rpm.

The resulting precipitate was filtrated and recovered (filtered) after stirring, and was washed with 20 L of ultrapure water. At this time, the washing was repeated until the electric conductance of the filtrate became 5 μS/cm or less. Next, the recovered precipitate was dried in a dryer at 80° C. for 2 days and then fired under the conditions of an oxygen atmosphere at 1,200° C. and 3 hours to obtain a coprecipitated raw material powder.

XRD Analysis

Powder X-ray diffraction (XRD) analysis was performed to confirm whether the resulting fired powder had a garnet structure. Measurement was carried out at 2θ=10° to 90° using a powder X-ray diffractometer (Smart Lab, manufactured by Rigaku Corporation). The resulting X-ray diffraction data was compared with the past reference data to confirm whether a garnet phase or a perovskite phase was present. Note that, when the diffraction peak of only the garnet phase appears, the existence of the perovskite phase is considered to be less than 1%, and this peak represents a garnet single phase.

Measurement of Primary Particle Size

In order to measure the primary particle size of the resulting fired powder, a field emission scanning electron microscope (FE-SEM) is used. A carbon tape is stuck on a stage, the powder is sprinkled thereon, and gold evaporation is performed to avoid charge-up. One hundred or more primary particles were extracted from several FE-SEM photographs, and the sizes of all the particles were counted and averaged. This value was defined as the primary particle size.

The above results are summarized in Table 1.

All the resulting powders had a garnet structure, and the primary particle size was also the same. Note that only a ratio of Tb to Y is changed in the composition, and the amounts of Al and Sc are all the same.

polyethylene glycol was used as a dispersant, and a polyvinyl alcohol-based binder was used as a binder. In addition, tetraethoxysilane (TEOS) was added as a sintering aid in an amount of 1,000 ppm in $SiO_2$ conversion with respect to the raw material powder (fired powder+sintering aid). After the ball mill mixing, the resulting slurry was filtrated using a nylon filter with a pore size of 10 μm to obtain a raw material powder slurry. Next, this raw material powder slurry was spray-dried to be granulated, and uniaxial pressing and subsequent CIP were performed using this granular raw material powder to obtain a compact with a relative density of about 53%.

Then, the compact was subjected to the degreasing treatment by heating at 800° C. in the atmosphere. Subsequently, the resulting degreased compact was placed in an oxygen atmosphere furnace and sintered under the conditions of 1,720° C. and 10 hours. Next, the sintered body was put in a tungsten container and subjected to the HIP treatment under the conditions of Ar pressure of 196 MPa, 1,600° C., and 2 hours. The resulting sample was somewhat dark, so the sample was annealed at 1,300° C. under an oxygen atmosphere.

The transparent sintered body thus obtained was ground and polished to have a diameter of 5 mmϕ×length of 25 mmL. Both end faces were optically polished so as to have surface accuracy (flatness) of λ/10 (λ=633 nm).

Evaluation Method

The optical properties (total light transmittance, extinction ratio and Verdet constant) and the thermal lens compatible output were evaluated as below for each of the samples obtained as described above.

Total Light Transmittance

The total light transmittance of the optically polished transparent sintered body with a length of 25 mm was measured with reference to JIS K7105 (ISO 13468-2: 1999).

That is, an inlet opening and an outlet opening, through which the light travels, are provided in an integrating sphere, and a sample is placed at the inlet opening portion. By attaching a reflector to the outlet opening portion, it is possible to detect all the light emitted from the sample with the integrating sphere, and the transmittance was measured from the ratio of the intensity of the detected emitted light to the intensity of the light incident on the sample. The measurement was performed using a spectrophotometer (V-670, manufactured by JASCO Corporation) with an attached integrating sphere. At that time, a pinhole was provided so that the spot diameter of the irradiation light became 3 mm. The measurement was performed by a double

TABLE 1

| | | Stirring Treatment | | Measurement Result | |
| | | --- | --- | --- | --- |
| | Composition | Liquid Temp. (° C.) | Stirring Time (h) | Firing treatment Firing Temp. (° C.) | XRD Analysis | Primary Particle Size (nm) |
| --- | --- | --- | --- | --- | --- | --- |
| Example 1-1 | $(Tb_{0.598}Y_{0.398}Sc_{0.004})_3(Al_{0.97}Sc_{0.03})_5O_{12}$ | 30 | 24 | 1,200 | Garnet | 120 |
| Example 1-2 | $(Tb_{0.798}Y_{0.198}Sc_{0.004})_3(Al_{0.97}Sc_{0.03})_5O_{12}$ | 30 | 24 | 1,200 | Garnet | 120 |
| Example 1-3 | $(Tb_{0.898}Y_{0.098}Sc_{0.004})_3(Al_{0.97}Sc_{0.03})_5O_{12}$ | 30 | 24 | 1,200 | Garnet | 120 |
| Comparative Example 1-1 | $(Tb_{0.996}Sc_{0.004})_3(Al_{0.97}Sc_{0.03})_5O_{12}$ | 30 | 24 | 1,200 | Garnet | 120 |
| Comparative Example 1-2 | $(Tb_{0.498}Y_{0.498}Sc_{0.004})_3(Al_{0.97}Sc_{0.03})_5O_{12}$ | 30 | 24 | 1,200 | Garnet | 120 |

Production of Transparent Ceramic

The resulting fired powder (white powder) was subjected to ball mill mixing using nylon balls with a diameter of 2 mmϕ and high purity ethanol as a solvent. At that time, beam method using a halogen lamp as a light source, and a photomultiplier tube (wavelength of 750 nm or less) and a PbS photoelectric cell (wavelength of 750 nm or more) as detectors. For the total light transmittance, a value of 1,064 nm was used for the wavelength. The total light transmittance was measured for five samples from each Example and was evaluated with two significant figures and percentage as unit.

Extinction Ratio

With reference to JIS C5877-2: 2012, the extinction ratio was measured by an optical system using and assembling a laser light source (manufactured by NKT Photonics), a power meter (manufactured by Gentec), a Ge photodetector (manufactured by Gentec) and polarizers (manufactured by Sigmakoki Co., Ltd.). The laser light used had a wavelength of 1,064 nm and a beam diameter of 1 to 3 mmϕ. The room temperature at the time of measurement was 24° C.

First, two polarizers were rotated in the absence of the sample, the polarizers were fixed at positions where the power of light become maximum, and power $P_{//}$ of the light was measured. Thereafter, the sample was inserted between the two polarizers, the polarizer (analyzer) near the detector was rotated by 90° to form crossed nicols, and power $P_\perp$ of the light at this time was measured. The extinction ratio (dB) was determined based on the following equation:

Extinction Ratio (dB)=10 $\log_{10}(P_{//}/P_\perp)$

Subsequently, the optically polished sample was coated with an antireflection film (AR coating) designed to have a center wavelength of 1,064 nm. For each resulting sample, the Verdet constant and the thermal lens compatible output were measured as below.

Verdet Constant

As shown in FIG. 2, each resulting ceramic sample (corresponding to the Faraday rotator 110) was inserted into the center of a neodymium-iron-boron magnet (magnet 140) with an outer diameter of 32 mm, an inner diameter of 6 mm and a length of 40 mm, polarizers (the polarizer 120 and the analyzer 130) were inserted at both ends thereof. Thereafter, high power laser beams with a wavelength of 1,064 nm were incident on the both end faces by using a high power laser (beam diameter: 1.6 mm) manufactured by IPG Photonics Corporation to determine the Faraday rotation angle θ. The Faraday rotation angle θ was defined as an angle that exhibits the maximum transmittance when the polarizer on the emission side was rotated.

A Verdet constant V was determined based on the following equation. Note that a magnetic flux density (B) applied to the sample was calculated by simulation based on the shape and dimensions of the measurement system, a residual magnetic flux density (Br) and coercivity (Hc).

θ=$V \times B \times L$ wherein θ is the Faraday rotation angle (Rad), V is the Verdet constant (Rad/(T·m)), B is the magnetic flux density (T), and L is the length of the Faraday rotator (0.025 m in this case).

Comprehensive Evaluation of Optical Properties

For comprehensive evaluation, ⊚ means that the following three target properties are all met, Δ means that the two following target properties are met, and x means that the one or less following target properties are met. The target properties are the total light transmittance of 83.5% or more, the extinction ratio of 40 dB or more, and the Verdet constant of 30 rad/T·m or more.

Note that, when the comprehensive evaluation was x, measurement of the next thermal lens compatible output was not performed.

Thermal Lens Compatible Output (Thermal Lens Effect Measurement and Compatible Laser Beam Intensity)

Laser irradiation was performed with a CW laser (wavelength: 1,070 nm, upper output limit: 100 W) manufactured by IPG Photonics Corporation, and the shape of the laser beam was evaluated by using a beam propagation analyzer (mode master manufactured by Coherent Inc.). That is, when the laser focal position in the absence of the sample was $f_0$, and the laser focal position when the sample was placed thereon was f, the laser intensity $|f_0-f|<0.1 \times f_0$ was defined as the compatible laser intensity. That is, when the deviation (the maximum position variation amount) from the original focal position was less than 10% due the presence or absence of the sample, the laser output at this time was defined as compatible. The output was measured up to 100 W, and the maximum possible output was determined.

The above results are summarized in Table 2.

TABLE 2

| | Composition | Evaluation Results of Optical Properties | | | | |
| --- | --- | --- | --- | --- | --- | --- |
| | | Total Light Transmittance @ 1,064 nm (%) | Extinction Ratio (dB) | Verdet Constant (Rad/T · m) | Comprehensive Evaluation | Thermal Lens Compatible Output (W) |
| Example 1-1 | $(Tb_{0.598}Y_{0.398}Sc_{0.004})_3(Al_{0.97}Sc_{0.03})_5O_{12}$ | 84.5 | 49 | 35 | ⊚ | 100 |
| Example 1-2 | $(Tb_{0.798}Y_{0.198}Sc_{0.004})_3(Al_{0.97}Sc_{0.03})_5O_{12}$ | 83.9 | 45 | 47 | ⊚ | 100 |
| Example 1-3 | $(Tb_{0.898}Y_{0.098}Sc_{0.004})_3(Al_{0.97}Sc_{0.03})_5O_{12}$ | 83.8 | 46 | 53 | ⊚ | 100 |
| Comparative Example 1-1 | $(Tb_{0.996}Sc_{0.004})_3(Al_{0.97}Sc_{0.03})_5O_{12}$ | 83.1 | 41 | 60 | Δ | 80 |
| Comparative Example 1-2 | $(Tb_{0.498}Y_{0.498}Sc_{0.004})_3(Al_{0.97}Sc_{0.03})_5O_{12}$ | 84.3 | 49 | 29 | Δ | 100 |

From the above results of Examples 1-1 to 1-3, when a certain amount or more of Tb was contained (when all the conditions of x, y, 1-x-y and z in the formula (1) were met), all the above three properties were met, and the thermal lens compatible output was also 100 W (i.e., there was a potential of exceeding 100 W). On the other hand, when Y was not compounded (x=0 in the formula (1)) as in Comparative Example 1-1, the total light transmittance decreased because the light absorption amount increased. As a result, the thermal lens compatible output was also 80 W. Moreover, when the amount of Tb is too small (1-x-y=0.498 in the formula (1)) as in Comparative Example 1-2, the target properties of the total light transmittance and the extinction ratio were met, but the Verdet constant was small. Thus, even if the thermal lens compatible output is 100 W, it is undesirable from the viewpoint of increasing the size as an isolator.

Example 2

The liquid temperature and the stirring time of the stirring treatment for the preparation of the co-precipitate of the components (a), (b), (c) and (d), and the firing temperature were changed from those in Example 1-1 as shown in Table 3. Other than that, under the same conditions as in Example 1-1, a sinterable garnet-type complex oxide powder was created, and a transparent ceramic was further produced by using this garnet-type complex oxide powder.

The above results are summarized in Table 3.

As can be seen from the above results, good results were obtained when the liquid temperature of the stirring treatment at the time of preparing the co-precipitate was 50° C. or less and the firing temperature was 1,000 to 1,300° C. However, when the liquid temperature of the stirring treatment at the time of preparing the co-precipitate was 60° C. (Comparative Example 2-1) or when the firing temperature was 1,400° C. (Comparative Example 2-3), the primary particles became large with the primary particle size exceeding 200 nm. Thus, sinterability was poor, and bubbles were difficult to be escaped, resulting in poor total light transmit-

TABLE 3

| | | Stirring Treatment | | Measurement Result | |
|---|---|---|---|---|---|
| | Composition | Liquid Temp. (° C.) | Stirring Time (h) | Firing treatment Firing Temp. (° C.) | XRD Analysis | Primary Particle Size (nm) |
| Example 2-1 | $(Tb_{0.598}Y_{0.398}Sc_{0.004})_3(Al_{0.97}Sc_{0.03})_5O_{12}$ | 20 | 24 | 1,200 | Garnet | 90 |
| Example 2-2 | $(Tb_{0.598}Y_{0.398}Sc_{0.004})_3(Al_{0.97}Sc_{0.03})_5O_{12}$ | 40 | 24 | 1,200 | Garnet | 160 |
| Example 2-3 | $(Tb_{0.598}Y_{0.398}Sc_{0.004})_3(Al_{0.97}Sc_{0.03})_5O_{12}$ | 50 | 24 | 1,200 | Garnet | 190 |
| Example 2-4 | $(Tb_{0.598}Y_{0.398}Sc_{0.004})_3(Al_{0.97}Sc_{0.03})_5O_{12}$ | 30 | 12 | 1,200 | Garnet | 110 |
| Example 2-5 | $(Tb_{0.598}Y_{0.398}Sc_{0.004})_3(Al_{0.97}Sc_{0.03})_5O_{12}$ | 30 | 36 | 1,200 | Garnet | 130 |
| Example 2-6 | $(Tb_{0.598}Y_{0.398}Sc_{0.004})_3(Al_{0.97}Sc_{0.03})_5O_{12}$ | 30 | 24 | 1,000 | Garnet | 80 |
| Example 2-7 | $(Tb_{0.598}Y_{0.398}Sc_{0.004})_3(Al_{0.97}Sc_{0.03})_5O_{12}$ | 30 | 24 | 1,100 | Garnet | 100 |
| Example 2-8 | $(Tb_{0.598}Y_{0.398}Sc_{0.004})_3(Al_{0.97}Sc_{0.03})_5O_{12}$ | 30 | 24 | 1,300 | Garnet | 160 |
| Comparative Example 2-1 | $(Tb_{0.598}Y_{0.398}Sc_{0.004})_3(Al_{0.97}Sc_{0.03})_5O_{12}$ | 60 | 24 | 1,200 | Garnet | 250 |
| Comparative Example 2-2 | $(Tb_{0.598}Y_{0.398}Sc_{0.004})_3(Al_{0.97}Sc_{0.03})_5O_{12}$ | 30 | 24 | 900 | Unidentified | 60 |
| Comparative Example 2-3 | $(Tb_{0.598}Y_{0.398}Sc_{0.004})_3(Al_{0.97}Sc_{0.03})_5O_{12}$ | 30 | 24 | 1,400 | Garnet | 210 |

As shown in Table 3, even if the liquid temperature and the stirring time of the stirring treatment for the preparation of the co-precipitate are changed, the sinterable garnet-type complex oxide powder has a garnet structure as long as the firing temperature is 1,000° C. or more although the primary particle size changes. However, as in Comparative Example 2-2, when the firing temperature was 900° C., the sinterable garnet-type complex oxide powder did not have a garnet structure and became amorphous. Therefore, it can be seen that the firing temperature of 1,000° C. or more is necessary to obtain the garnet-type complex oxide powder.

The results of evaluating the transparent ceramic samples of this Example in the same manner as in Example 1 are shown in Table 4.

tance and extinction ratio. On the other hand, when the firing temperature was 900° C. (Comparative Example 2-2), the primary particle size became small in turn. Thus, the sinterability was too good, and bubbles remained at the grain boundary after sintering, resulting in poor transparency.

Example 3

The amount of the aqueous solution containing (d) Sc was mainly changed at the time of preparing the mixed aqueous solution to change the composition of the final complex oxide in Example 1-1. Other than that, under the same conditions as in Example 1-1, sinterable garnet-type com-

TABLE 4

| | | Evaluation Results of Optical Properties | | | | |
|---|---|---|---|---|---|---|
| | Composition | Total Light Transmittance @ 1,064 nm (%) | Extinction Ratio (dB) | Verdet Constant (Rad/T · m) | Comprehensive Evaluation | Thermal Lens Compatible Output (W) |
| Example 2-1 | $(Tb_{0.598}Y_{0.398}Sc_{0.004})_3(Al_{0.97}Sc_{0.03})_5O_{12}$ | 83.9 | 49 | 35 | ⊚ | 100 |
| Example 2-2 | $(Tb_{0.598}Y_{0.398}Sc_{0.004})_3(Al_{0.97}Sc_{0.03})_5O_{12}$ | 84.1 | 46 | 35 | ⊚ | 100 |
| Example 2-3 | $(Tb_{0.598}Y_{0.398}Sc_{0.004})_3(Al_{0.97}Sc_{0.03})_5O_{12}$ | 83.6 | 48 | 35 | ⊚ | 100 |
| Example 2-4 | $(Tb_{0.598}Y_{0.398}Sc_{0.004})_3(Al_{0.97}Sc_{0.03})_5O_{12}$ | 83.8 | 45 | 35 | ⊚ | 100 |
| Example 2-5 | $(Tb_{0.598}Y_{0.398}Sc_{0.004})_3(Al_{0.97}Sc_{0.03})_5O_{12}$ | 84.2 | 48 | 35 | ⊚ | 100 |
| Example 2-6 | $(Tb_{0.598}Y_{0.398}Sc_{0.004})_3(Al_{0.97}Sc_{0.03})_5O_{12}$ | 83.6 | 42 | 35 | ⊚ | 100 |
| Example 2-7 | $(Tb_{0.598}Y_{0.398}Sc_{0.004})_3(Al_{0.97}Sc_{0.03})_5O_{12}$ | 83.9 | 47 | 35 | ⊚ | 100 |
| Example 2-8 | $(Tb_{0.598}Y_{0.398}Sc_{0.004})_3(Al_{0.97}Sc_{0.03})_5O_{12}$ | 83.7 | 47 | 35 | ⊚ | 100 |
| Comparative Example 2-1 | $(Tb_{0.598}Y_{0.398}Sc_{0.004})_3(Al_{0.97}Sc_{0.03})_5O_{12}$ | 81.2 | 38 | 35 | X | Not Measured |
| Comparative Example 2-2 | $(Tb_{0.598}Y_{0.398}Sc_{0.004})_3(Al_{0.97}Sc_{0.03})_5O_{12}$ | 80.6 | 30 | 35 | X | Not Measured |
| Comparative Example 2-3 | $(Tb_{0.598}Y_{0.398}Sc_{0.004})_3(Al_{0.97}Sc_{0.03})_5O_{12}$ | 82.4 | 32 | 35 | X | Not Measured | plex oxide powder was created, and a transparent ceramic was further produced by using this garnet-type complex oxide powder.

The above results are summarized in Table 5.

99.999%) and scandium oxide powder (purity: 99.99%) manufactured by Shin-Etsu Chemical Co., Ltd., and high purity aluminum oxide powder (purity: 99.999%) manufactured by Taimei Chemicals Co., Ltd. were weighed so as to

TABLE 5

| | | Stirring Treatment | | Measurement Result | |
|---|---|---|---|---|---|
| | Composition | Liquid Temp. (° C.) | Stirring Time (h) | Firing treatment Firing Temp. (° C.) | XRD Analysis | Primary Particle Size (nm) |
| Example 3-1 | $(Tb_{0.596}Y_{0.396}Sc_{0.008})_3(Al_{0.95}Sc_{0.05})_5O_{12}$ | 30 | 24 | 1,200 | Garnet | 120 |
| Example 3-2 | $(Tb_{0.59}Y_{0.39}Sc_{0.02})_3(Al_{0.85}Sc_{0.15})_5O_{12}$ | 30 | 24 | 1,200 | Garnet | 120 |
| Example 3-3 | $(Tb_{0.595}Y_{0.395}Sc_{0.01})_3(Al_{0.9}Sc_{0.1})_5O_{12}$ | 30 | 24 | 1,200 | Garnet | 120 |
| Example 3-4 | $(Tb_{0.596}Y_{0.396}Sc_{0.008})_3(Al_{0.91}Sc_{0.09})_5O_{12}$ | 30 | 24 | 1,200 | Garnet | 120 |
| Comparative Example 3-1 | $(Tb_{0.600}Y_{0.400})_3(Al)_5O_{12}$ | 30 | 24 | 1,200 | Garnet + Perovskite | 120 |
| Comparative Example 3-2 | $(Tb_{0.599}Y_{0.399}Sc_{0.002})_3(Al_{0.997}Sc_{0.003})_5O_{12}$ | 30 | 24 | 1,200 | Garnet + Perovskite | 120 |

From the above results of Examples 3-1 to 3-4, when all the conditions of x, y, 1-x-y and z in the formula (1) were met, all the sinterable garnet complex oxide powders exhibited a garnet structure. On the other hand, in Comparative Examples 3-1 and 3-2, when y=z=0 in the formula (1) or when z<0.004, the perovskite phase was precipitated.

The results of evaluating the transparent ceramic samples of this Example in the same manner as in Example 1 are shown in Table 6.

have the composition shown in Table 7 (i.e., the same composition as in Example 1-1) and the total amount of 50 g. This mixed powder was subjected to ball mill crushing in ethanol by using nylon balls with a diameter of 2 mmϕ to be dispersed. Thereafter, the transparent ceramic was produced under the same conditions as in Example 1-1. That is, polyethylene glycol was used as a dispersant and a polyvinyl alcohol-based binder was used as a binder in the ball mill crushing. In addition, tetraethoxysilane (TEOS) was added

TABLE 6

| | | Evaluation Results of Optical Properties | | | | Thermal Lens |
|---|---|---|---|---|---|---|
| | Composition | Total Light Transmittance @ 1,064 nm (%) | Extinction Ratio (dB) | Verdet Constant (Rad/T · m) | Comprehensive Evaluation | Compatible Output (W) |
| Example 3-1 | $(Tb_{0.596}Y_{0.396}Sc_{0.008})_3(Al_{0.95}Sc_{0.05})_5O_{12}$ | 83.6 | 41 | 35 | ◎ | 100 |
| Example 3-2 | $(Tb_{0.59}Y_{0.39}Sc_{0.02})_3(Al_{0.85}Sc_{0.15})_5O_{12}$ | 83.7 | 42 | 35 | ◎ | 100 |
| Example 3-3 | $(Tb_{0.595}Y_{0.395}Sc_{0.01})_3(Al_{0.9}Sc_{0.1})_5O_{12}$ | 83.9 | 43 | 35 | ◎ | 100 |
| Example 3-4 | $(Tb_{0.596}Y_{0.396}Sc_{0.008})_3(Al_{0.91}Sc_{0.09})_5O_{12}$ | 83.6 | 41 | 35 | ◎ | 100 |
| Comparative Example 3-1 | $(Tb_{0.600}Y_{0.400})_3(Al)_5O_{12}$ | 79.4 | 35 | 35 | X | Not Measured |
| Comparative Example 3-2 | $(Tb_{0.599}Y_{0.399}Sc_{0.002})_3(Al_{0.997}Sc_{0.003})_5O_{12}$ | 76.4 | 34 | 35 | X | Not Measured |

From the above results, in Examples 3-1 to 3-4 in which the complex oxide powder had a single garnet structure, good optical properties were obtained, and the thermal lens compatible output was also 100 W. On the other hand, in Comparative Examples 3-1 and 3-2 in which complex oxide powder containing a perovskite phase in a garnet structure as a crystal structure was used, light scattering occurred due to the occurrence of the perovskite phase, and good results of the total light transmittance and the extinction ratio were not obtained.

Example 4

The process for preparing the raw material powder slurry in Example 1-1 was changed as below. Thereafter, under the same conditions as in Example 1-1, sinterable garnet-type complex oxide powder was created, and a transparent ceramic was further produced by using this garnet-type complex oxide powder.

Comparative Example 4-1

High purity terbium oxide powder ($Tb_4O_7$, purity: 99.999%), high purity yttrium oxide powder (purity:

as a sintering aid in an amount of 1,000 ppm in $SiO_2$ conversion with respect to the raw material powder (fired powder+sintering aid). After the ball mill mixing, the resulting slurry was filtrated using a nylon filter with a pore size of 10 μm to obtain a raw material powder slurry. This was granulated by spray-drying. The yield of the raw material powder at this stage was 90%.

Comparative Examples 4-2 and 4-3

High purity terbium oxide powder ($Tb_4O_7$, purity: 99.999%), high purity yttrium oxide powder (purity: 99.999%) and scandium oxide powder (purity: 99.99%) manufactured by Shin-Etsu Chemical Co., Ltd., and high purity aluminum oxide powder (purity: 99.999%) manufactured by Taimei Chemicals Co., Ltd. were weighed so as to have the composition shown in Table 7 (i.e., the same composition as in Example 1-1) and the total amount of 50 g. This mixed powder was subjected to ball mill crushing in ethanol by using nylon balls with a diameter of 2 mmϕ to be dispersed. At that time, polyethylene glycol was added as a dispersant, and TEOS as a sintering aid was added in an amount of 1,000 ppm in $SiO_2$ with respect to the raw material powder (fired powder+sintering aid). For the resulting slurry, only the solvent was volatilized by a rotary evaporator, and the powder was recovered. Next, the recovered powder was dry-crushed in an agate mortar and then calcined at 1,100° C. under an oxygen atmosphere. The resulting calcined powder was again subjected to ball mill crushing with using nylon balls with a diameter of 2 mmϕ to be slurried, and then a polyvinyl alcohol-based binder was added as a binder and mixed again.

Subsequently, the resulting slurry was used directly as the raw material powder slurry and spray-dried to be granulated. This is Comparative Example 4-2. The yield of the raw material powder at this stage was 92%. Moreover, the resulting slurry was filtrated using a nylon filter with a pore size of 10 μm to form a raw material powder slurry, and this raw material powder slurry was spray-dried to be granulated. This is Comparative Example 4-3. The yield of the raw material powder at this stage was 52%.

The above results are summarized in Table 7. Note that the result in Example 1-1 is also shown together with the measurement result of the yield of the raw material powder.

by a technique different from the present invention (i.e., the preparation of the ceramic powder was performed by powder mixing—ball mill crushing) caused some problems.

That is, in the case of using the raw material powder prepared only by powder mixing—ball mill crushing treatment without performing the calcination (firing) treatment as in Comparative Example 4-1, the compact was frequently laterally cracked (compact cracking) at the completion of the molding. For example, in the case of using such raw material powder to mold a thin plate shape with a height (thickness) of about 2 mm, there is no problem of compact cracking. However, in the case of molding a thick shape requiring a height of 40 mm at the molding stage as in this Example, the press pressure is not conveyed to the center of the compact at the stage of the uniaxial pressing, the shape of the compact could not be maintained. Thus, this is considered as the reason for cracking. Note that wet casting was also examined as a molding method other than uniaxial pressing. However, the particles were too fine in the raw material powder not yet fired, and cracking occurred during drying after slip casting.

TABLE 7

|  | Composition | Raw Material Powder Production Step | | Yield of Raw Material Powder (%) |
| --- | --- | --- | --- | --- |
|  |  | Preparation of Ceramic Powder | Preparation of Raw Material Powder |  |
| Example 1-1 | $(Tb_{0.598}Y_{0.398}Sc_{0.004})_3(Al_{0.97}Sc_{0.03})_5O_{12}$ | Coprecipitation-Firing | Slurrying-Filtration-Spray-Drying | 93 |
| Comparative Example 4-1 | $(Tb_{0.598}Y_{0.398}Sc_{0.004})_3(Al_{0.97}Sc_{0.03})_5O_{12}$ | Mixing-Ball Mill Crushing | Slurrying-Filtration-Spray-Drying | 90 |
| Comparative Example 4-2 | $(Tb_{0.598}Y_{0.398}Sc_{0.004})_3(Al_{0.97}Sc_{0.03})_5O_{12}$ | Mixing-Ball Mill Crushing | Slurrying-Powder Recovery-Calcination-Slurrying-Spray-Drying | 92 |
| Comparative Example 4-3 | $(Tb_{0.598}Y_{0.398}Sc_{0.004})_3(Al_{0.97}Sc_{0.03})_5O_{12}$ | Mixing-Ball Mill Crushing | Slurrying-Powder Recovery-Calcination-Slurrying-Filtration-Spray-Drying | 52 |

Using each granulated raw material powder, uniaxial pressing, CIP, degreasing, sintering, HIP, annealing, grinding and polishing, and optical polishing were sequentially performed under the same conditions as in Example 1-1 to obtain a ceramic sample.

The results of evaluating these samples in the same manner as in Example 1 are shown in Table 8. The result of Example 1-1 is also shown.

On the other hand, in Comparative Examples 4-2 and 4-3, no compact cracking occurred, but coarse aggregates of particles (grade of 100 μm in diameter), which could not be crushed in slurrying (ball mill crushing) performed after the calcination, occurred during the calcination. As in Comparative Example 4-2, when the raw material powder was formed with this coarse aggregates of particles remained therein, the coarse aggregates of particles could not be

TABLE 8

|  |  | Evaluation Results of Optical Properties | | | | Thermal Lens | |
| --- | --- | --- | --- | --- | --- | --- | --- |
|  | Composition | Total Light Transmittance @ 1,064 nm (%) | Extinction Ratio (dB) | Verdet Constant (Rad/T · m) | Comprehensive Evaluation | Compatible Output (W) | Note |
| Example 1-1 | $(Tb_{0.598}Y_{0.398}Sc_{0.004})_3(Al_{0.97}Sc_{0.03})_5O_{12}$ | 84.5 | 49 | 35 | ◎ | 100 |  |
| Comparative Example 4-1 | $(Tb_{0.598}Y_{0.398}Sc_{0.004})_3(Al_{0.97}Sc_{0.03})_5O_{12}$ | Unmeasurable | Unmeasurable | Unmeasurable | — | Unmeasurable | Compact Cracking |
| Comparative Example 4-2 | $(Tb_{0.598}Y_{0.398}Sc_{0.004})_3(Al_{0.97}Sc_{0.03})_5O_{12}$ | 81.9 | 24 | 35 | X | Not Measured |  |
| Comparative Example 4-3 | $(Tb_{0.598}Y_{0.398}Sc_{0.004})_3(Al_{0.97}Sc_{0.03})_5O_{12}$ | 83.8 | 41 | 35 | ◎ | 100 | Yield of Raw Matenal Powder: 52% |

As can be seen from the above results of Comparative Examples 4-1 to 4-3, all of the transparent ceramics created crushed with the applied pressure at the time of molding and remained, coarse cavities were formed in the compact, and good optical properties could not be obtained in the finally obtained ceramic. Meanwhile, when the coarse aggregates of particles was removed by filtration as in Comparative Example 4-3, the optical properties of the ceramic were improved, but the yield of the raw material powder was about 50%. This was not a favorable result from the viewpoint of the productivity.

On the other hand, as for the ceramic powder composed of the garnet-type complex oxide synthesized by the coprecipitation—firing method as in Example 1-1 according to the present invention, coarse aggregates of particles was not formed. Even if filtration was performed, the yield of the raw material powder exceeded 90%, and the transparent ceramic having good optical quality was obtained.

Note that, although the present invention has been described with reference to the above embodiments so far, the present invention is not limited to these embodiments and can be changed within a scope that a person skilled in the art can conceive, such as other embodiments, additions, modifications and deletions, and any aspects are included in the scope of the present invention as long as the effects of the present invention are exerted.

Japanese Patent Application No. 2018-099587 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a sinterable complex oxide powder comprising the steps of:
    adding, to a co-precipitating aqueous solution, aqueous solutions containing (a) terbium ions, (b) at least one other rare earth ions selected from the group consisting of yttrium ions and lanthanoid rare earth ions (excluding terbium ions), (c) aluminum ions and (d) scandium ions;
    stirring the resulting solution at a liquid temperature of 50° C. or less to induce a co-precipitate of the components (a), (b), (c) and (d);
    filtering, heating and dehydrating the co-precipitate; and firing the co-precipitate thereafter at from 1,000° C. to 1,300° C., thereby forming a powder composed of garnet-type complex oxide represented by the formula (1):

$$(Tb_{1-x-y}R_xSc_y)_3(Al_{1-z}Sc_z)_5O_{12} \qquad (1)$$

wherein R is at least one element selected from the group consisting of yttrium and lanthanoid rare earth elements (excluding terbium), $0.05 \leq x < 0.45$, $0 < y < 0.1$, $0.5 < 1-x-y < 0.95$, and $0.004 < z < 0.2$.

2. The method for preparing the sinterable complex oxide powder according to claim 1, wherein the component (b) is the yttrium ions and/or lutetium ions.

3. The method for preparing the sinterable complex oxide powder according to claim 1, wherein the aqueous solutions containing the components (a), (b), (c) and (d) are inorganic acid aqueous solutions, and the co-precipitating aqueous solution is a carbonate aqueous solution.

4. The method for preparing the sinterable complex oxide powder according to claim 1, wherein the aqueous solution containing the component (a), the aqueous solution containing the component (b), the aqueous solution containing the component (c) and the aqueous solution containing the component (d) are separately prepared and mixed, and this mixed aqueous solution is added to the co-precipitating aqueous solution.

5. The method for preparing the sinterable complex oxide powder according to claim 1, wherein the aqueous solutions containing the components (a), (b), (c) and (d) are added to the co-precipitating aqueous solution, and then this solution is stirred for 12 hours or longer while keeping the solution at a temperature of from 20° C. to 50° C. to grow particles of the co-precipitate of the components (a), (b), (c) and (d).

6. A method for manufacturing a transparent ceramic material comprising the steps of molding the garnet-type complex oxide powder prepared by the method of claim 1 into a compact, sintering the compact thereafter and pressure sintering the compact.

* * * * *